(12) United States Patent
Otomo et al.

(10) Patent No.: US 9,507,635 B2
(45) Date of Patent: Nov. 29, 2016

(54) ASSIGNING SPECULATIVE PROCESSES TO PLURALITY OF CPUS BASED ON CALCULATED MAXIMUM NUMBER OF SPECULATIVE PROCESSES CAPABLE OF BEING ASSIGNED AND OTHER PROCESSES ASSIGNED TO EACH CPU

(71) Applicant: FUJITSU LIMITED, Kawasaki-shi, Kanagawa (JP)

(72) Inventors: Toshiya Otomo, Kawasaki (JP); Koichiro Yamashita, Hachioji (JP); Takahisa Suzuki, Kawasaki (JP); Hiromasa Yamauchi, Kawasaki (JP); Koji Kurihara, Kawasaki (JP); Naoki Odate, Akiruno (JP)

(73) Assignee: FUJITSU LIMITED, Kawasaki (JP)

( * ) Notice: Subject to any disclaimer, the term of this patent is extended or adjusted under 35 U.S.C. 154(b) by 639 days.

(21) Appl. No.: 13/940,932

(22) Filed: Jul. 12, 2013

(65) Prior Publication Data
US 2013/0305257 A1    Nov. 14, 2013

Related U.S. Application Data

(63) Continuation of application No. PCT/JP2011/050485, filed on Jan. 13, 2011.

(51) Int. Cl.
*G06F 9/50* (2006.01)
*G06F 9/48* (2006.01)

(52) U.S. Cl.
CPC ............... *G06F 9/50* (2013.01); *G06F 9/4893* (2013.01); *G06F 2209/483* (2013.01); *G06F 2209/504* (2013.01); *Y02B 60/142* (2013.01); *Y02B 60/144* (2013.01)

(58) Field of Classification Search
None
See application file for complete search history.

(56) References Cited

U.S. PATENT DOCUMENTS

| 8,140,646 | B2 * | 3/2012 | Mickens | G06F 17/30902 709/203 |
| 2005/0066328 | A1 * | 3/2005 | Lam | G06F 9/5083 718/100 |
| 2005/0144602 | A1 * | 6/2005 | Ngai | G06F 8/41 717/151 |
| 2006/0095807 | A1 | 5/2006 | Grochowski et al. | |

(Continued)

FOREIGN PATENT DOCUMENTS

| JP | 11-24982 | 1/1999 |
| JP | 11-259280 | 9/1999 |

(Continued)

OTHER PUBLICATIONS

PCT International Preliminary Report on Patentability mailed Jul. 25, 2013 in corresponding International Application No. PCT/JP2011/050485.
International Search Report mailed Apr. 19, 2011 in corresponding International Application No. PCT/JP2011/050485.

*Primary Examiner* — Abdullah Al Kawsar
(74) *Attorney, Agent, or Firm* — Staas & Halsey LLP

(57) ABSTRACT

A scheduling method is executed by a given CPU among multiple CPUs. The scheduling method includes subtracting for each of the CPUs, a number of processes assigned to the CPU from a maximum number of speculative processes that can be assigned to each of the CPUs; summing results yielded at the subtracting to yield a total number of speculative processes; and assigning to the CPUs, speculative processes of a number is less than or equal to the total number of speculative processes.

8 Claims, 13 Drawing Sheets

(56) References Cited

U.S. PATENT DOCUMENTS

| | | |
|---|---|---|
| 2007/0038763 A1 | 2/2007 | Oestvall |
| 2007/0094561 A1* | 4/2007 | Udell ............... G01R 31/31707 714/738 |
| 2009/0019445 A1* | 1/2009 | Oswald ................ G06F 9/5011 718/104 |
| 2010/0095091 A1 | 4/2010 | Asanaka |

FOREIGN PATENT DOCUMENTS

| | | | |
|---|---|---|---|
| JP | 2001-356904 | | 12/2001 |
| JP | 2007-520777 | | 7/2007 |
| JP | 2008-513912 | | 5/2008 |
| JP | 2008-242647 | | 10/2008 |
| JP | 2009-48269 | | 3/2009 |
| WO | WO2011045112 | * | 8/2010 |

* cited by examiner

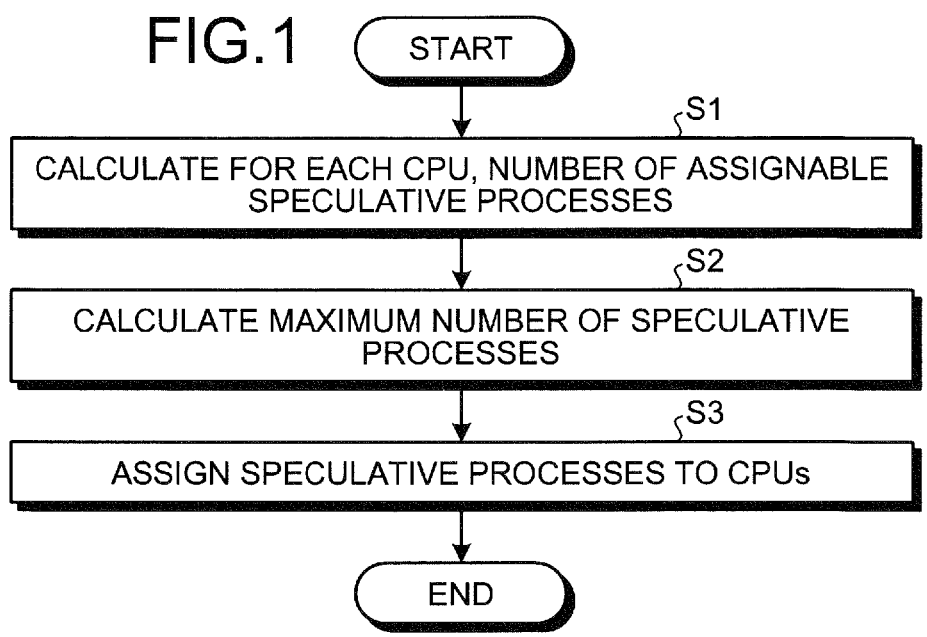

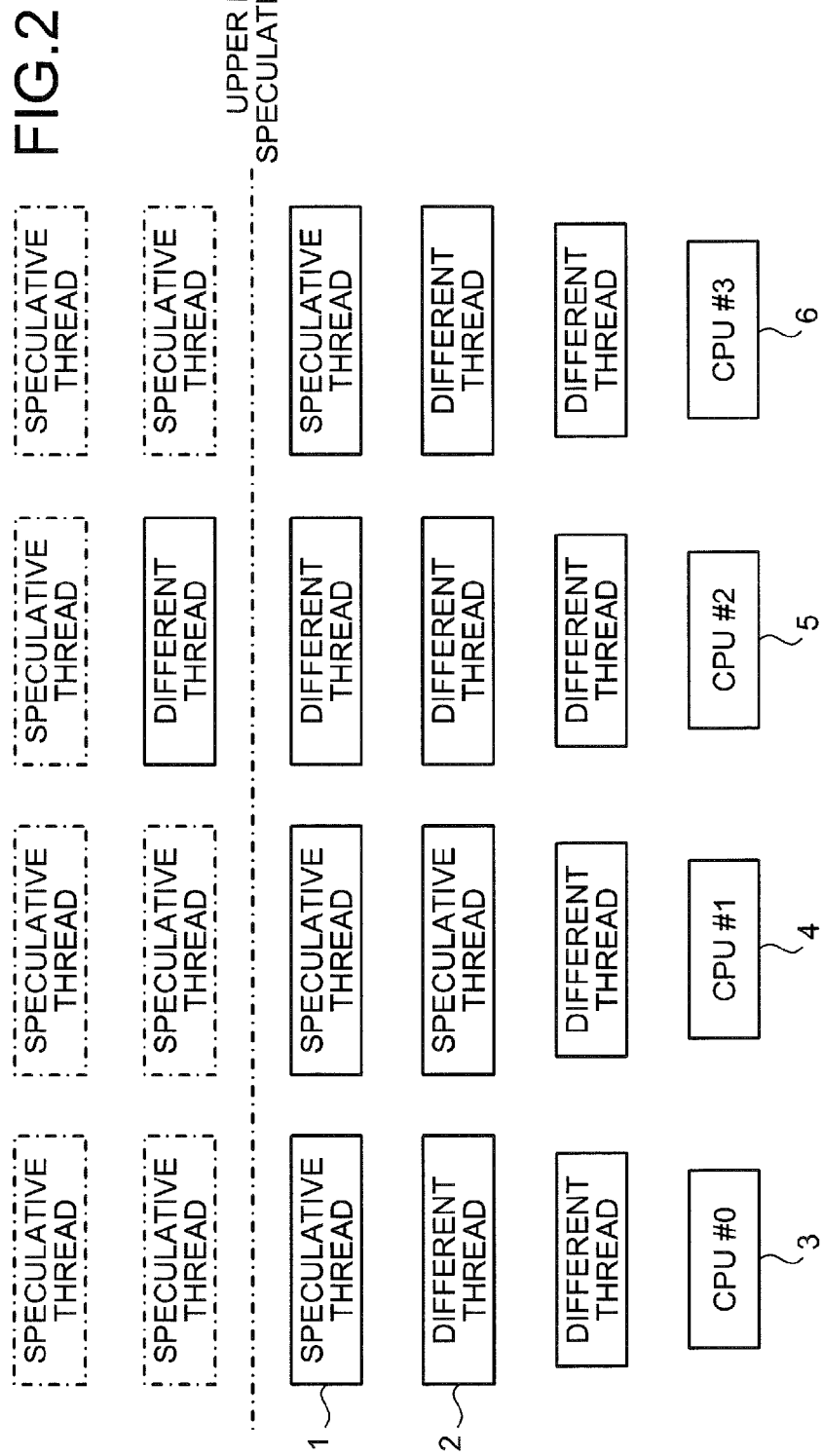

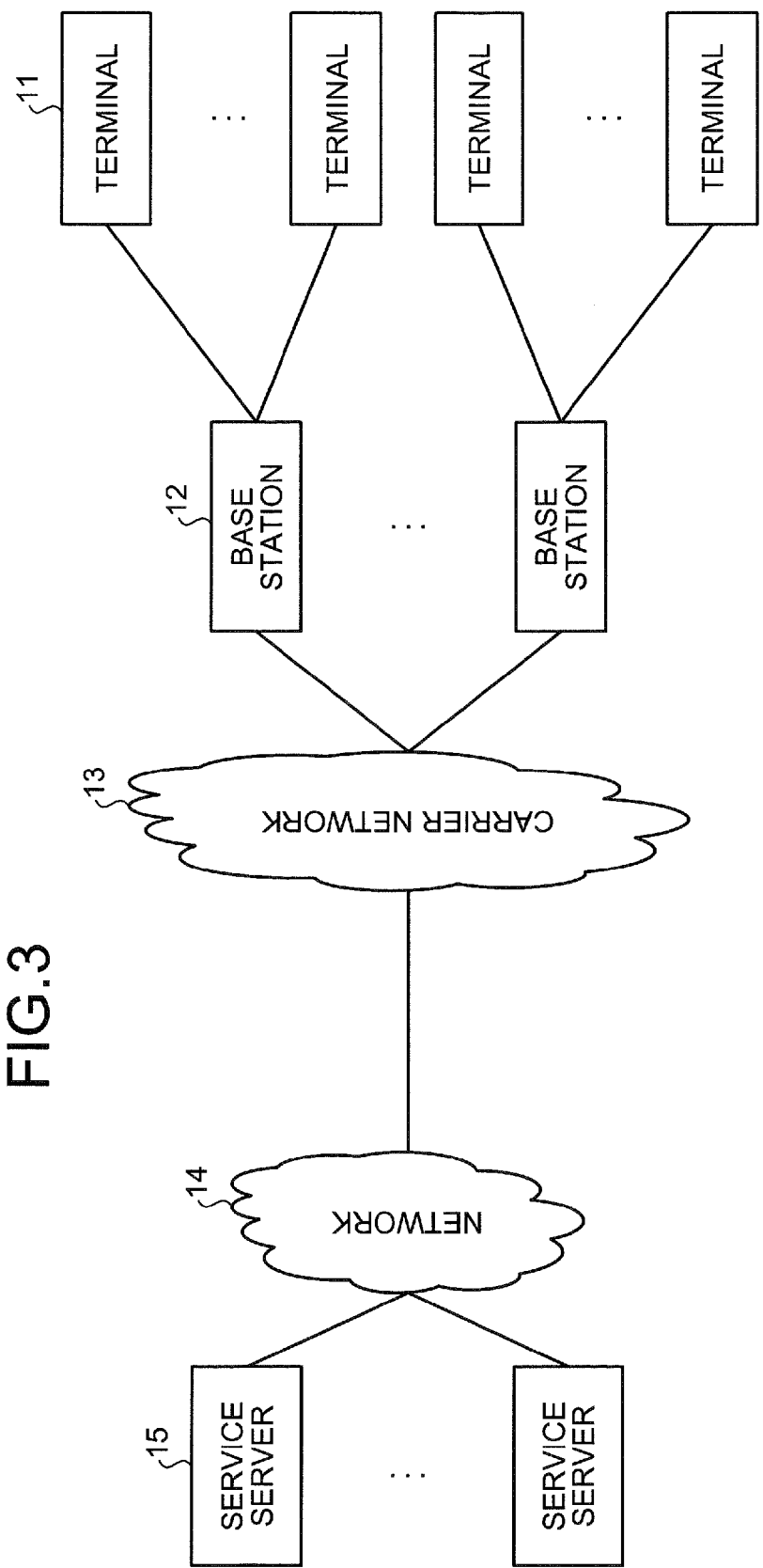

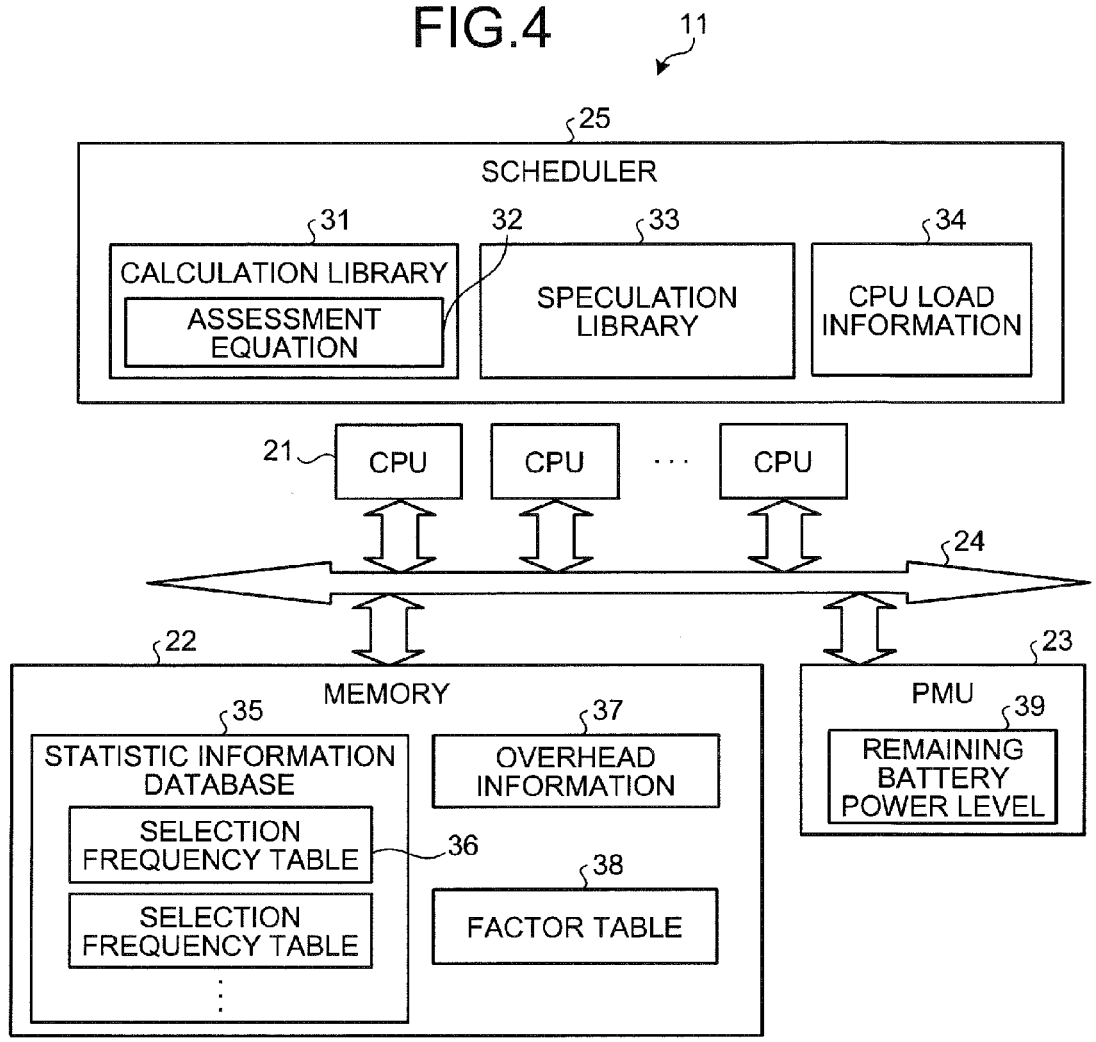

| REMAINING BATTERY POWER LEVEL | α | β |
|---|---|---|
| 100% | 2 | 1 |
| 50% | 1 | 2 |
| 30% | 0 | 2 |

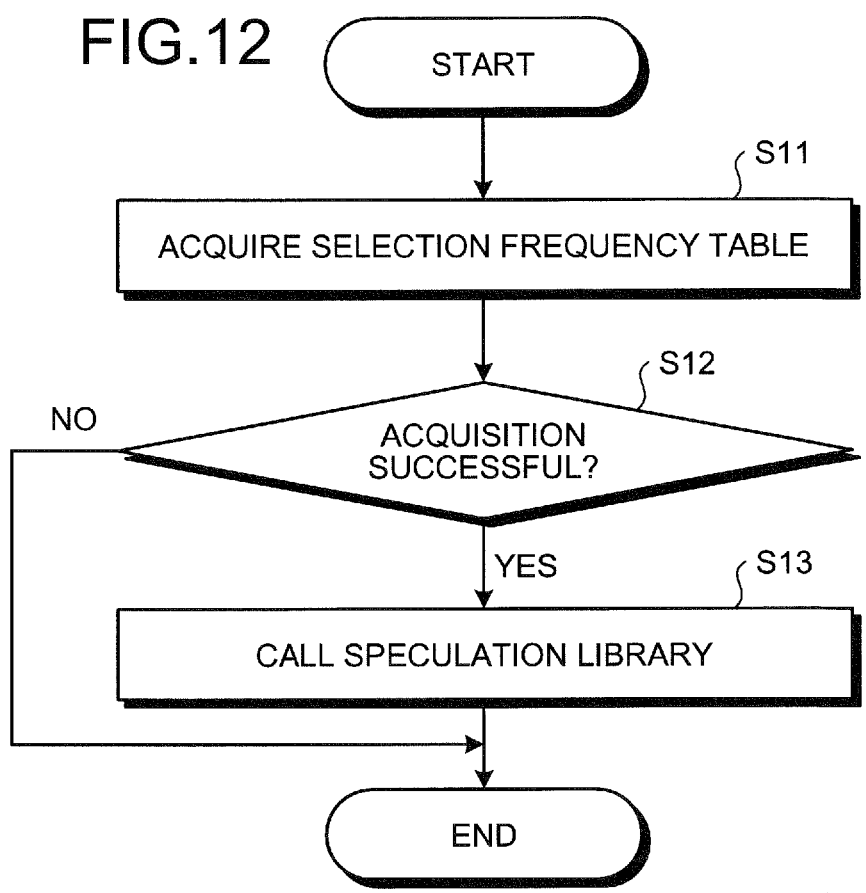

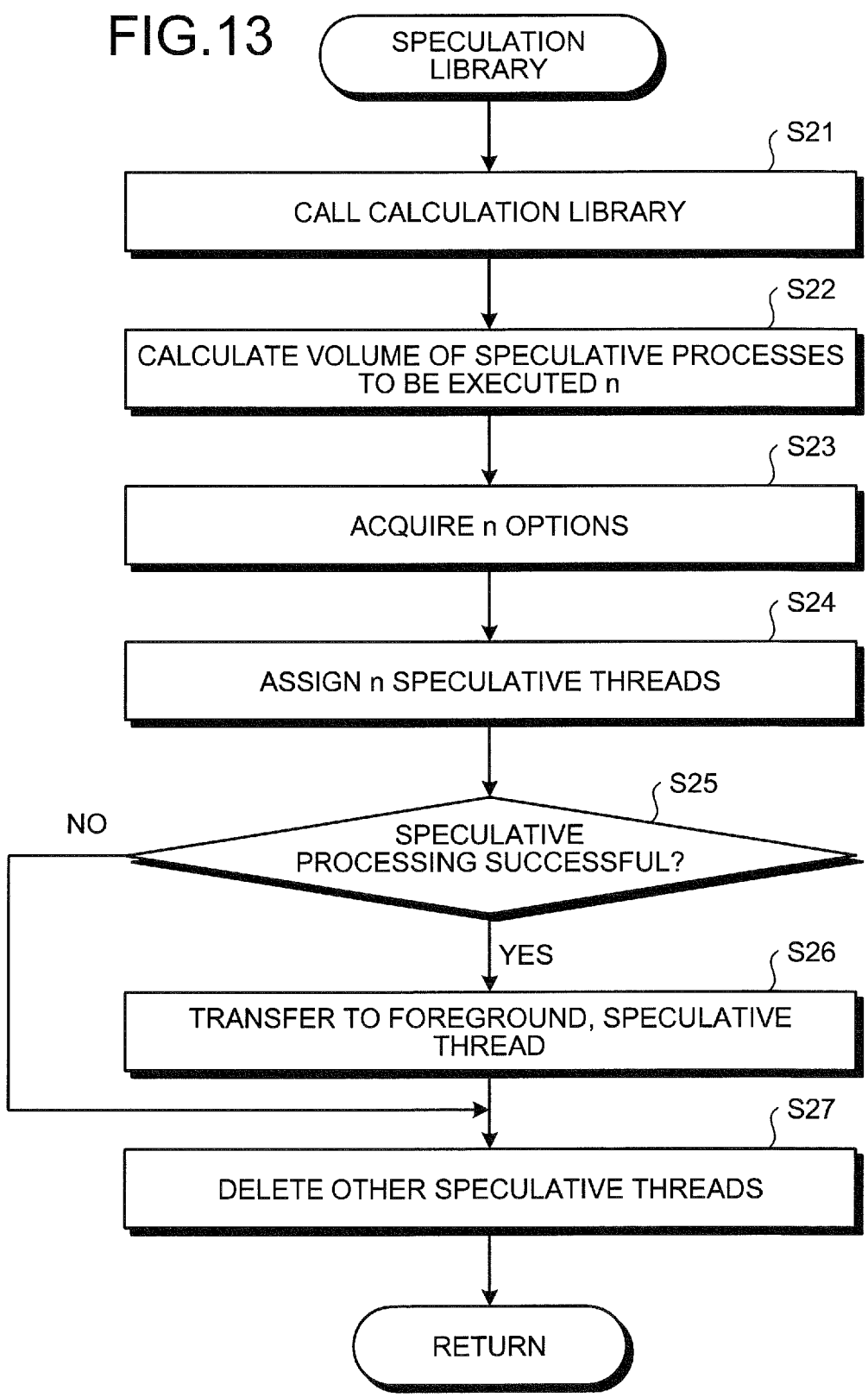

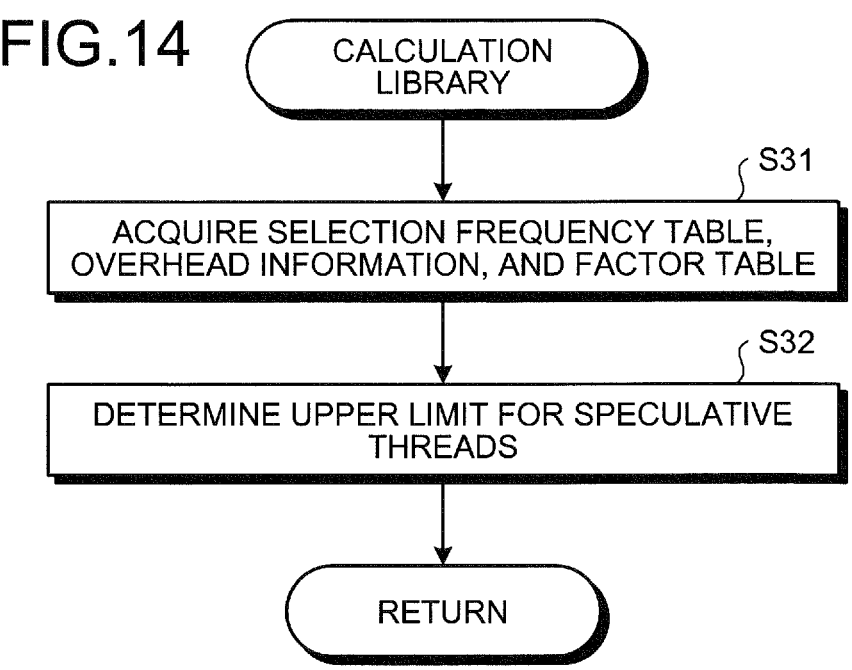

ASSIGNING SPECULATIVE PROCESSES TO PLURALITY OF CPUS BASED ON CALCULATED MAXIMUM NUMBER OF SPECULATIVE PROCESSES CAPABLE OF BEING ASSIGNED AND OTHER PROCESSES ASSIGNED TO EACH CPU

CROSS REFERENCE TO RELATED APPLICATIONS

This application is a continuation application of International Application PCT/JP2011/050485, filed on Jan. 13, 2011 and designating the U.S., the entire contents of which are incorporated herein by reference.

FIELD

The embodiments discussed herein are related to a scheduling method and a scheduling system.

BACKGROUND

According to a conventional technique for speculative processing, a computer system executes in advance and in the background, a process that is expected to be executed in future. For example, according to another technique, a list of links to Web pages is saved together with selection frequencies of the Web pages, based on a past link history; and data of a uniform resource locator (URL) frequently selected in the past is read in advance into a cache area so that Web page data can be displayed at high speed. Another technique manages the power of a battery for a battery-powered multi-task computer device. For example, a method is known that inhibits the execution of unreliable applications standing by in the background.

For examples, refer to Japanese Laid-Open Patent Publication No. H11-24982 and Published Japanese-Translation of PCT Application, Publication No. 2007-520777.

The greater the volume of speculative processes to be executed, the greater the possibility of the results of speculative processes actually being used, i.e., the success rate of the speculative processing increases. Nonetheless, an increase in the volume of speculative processes to be executed leads to an increase in the consumption of such resources such as memory areas and power. For this reason, in a self-contained device, which has limited resources, such as a cellular phone, overhead caused by switching threads executed by speculative processes increases, reducing power efficiency and thus, brings about a problem of increased power consumption. Reducing the volume of speculative processes to be executed, on the other hand, lowers the success rate of the speculative processing.

SUMMARY

According to an aspect of an embodiment, a scheduling method is executed by a given CPU among multiple CPUs. The scheduling method includes subtracting for each of the CPUs, a number of processes assigned to the CPU from a maximum number of speculative processes that can be assigned to each of the CPUs; summing results yielded at the subtracting to yield a total number of speculative processes; and assigning to the CPUs, speculative processes of a number is less than or equal to the total number of speculative processes.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a flowchart of a scheduling method according to a first example of an embodiment;

FIG. 2 is a diagram for explaining the scheduling method of the first example;

FIG. 3 is a block diagram of an example of a mobile communication system according to a second example;

FIG. 4 is a block diagram of a terminal of the second example;

FIG. 5 is a diagram of an example of a selection frequency table of the second example;

FIG. 12 is a flowchart of operation of the scheduler according to the scheduling method of the second example;

FIG. 13 is a flowchart of operation of the speculation library according to the scheduling method of the second example; and FIG. 14 is a flowchart of operation of the calculation library according to the scheduling method of the second example.

DESCRIPTION OF EMBODIMENTS

Figure 6:
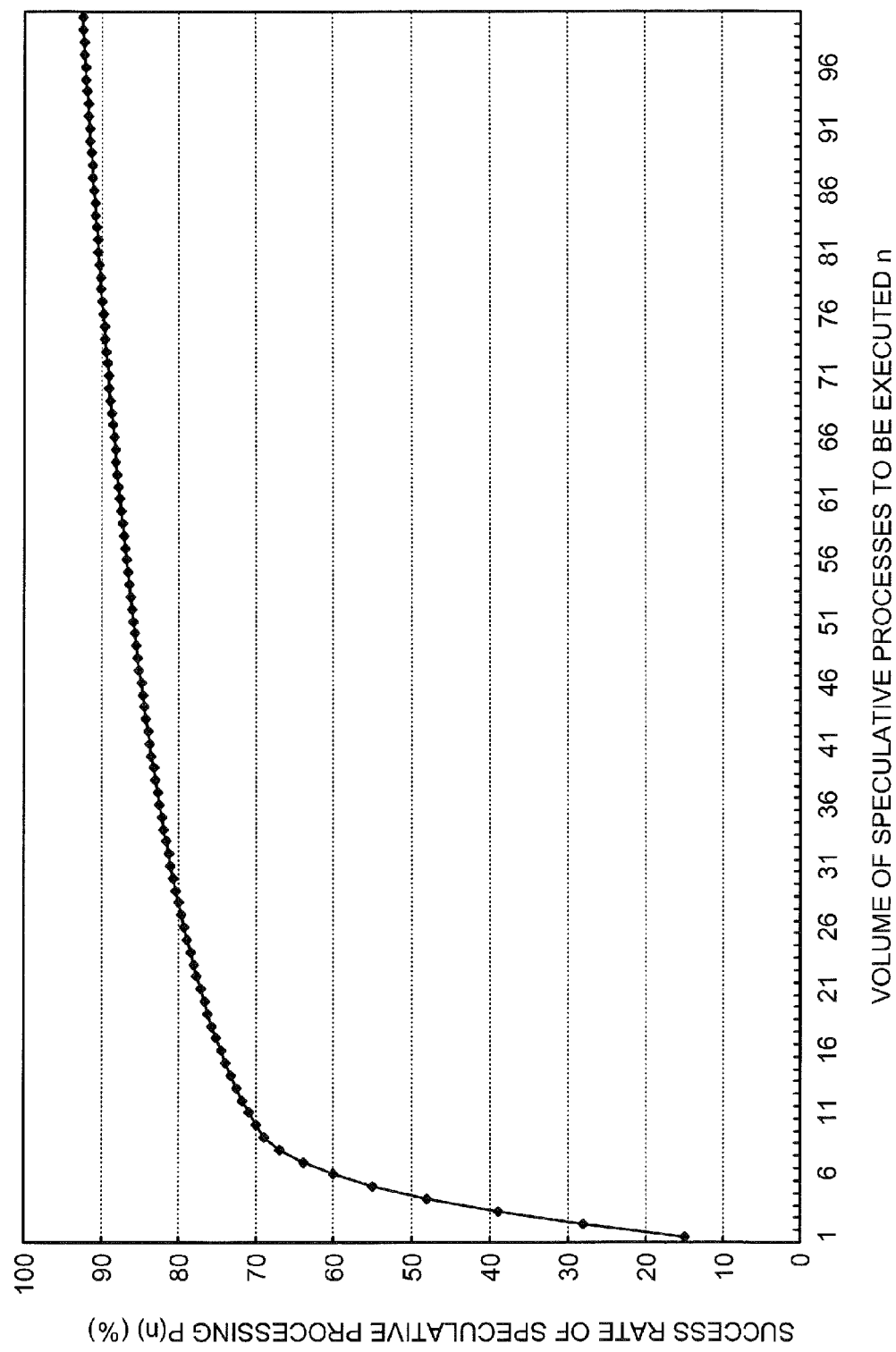
FIG. 6 is a graph depicting an example of a relation between the volume of speculative processes to be executed and a success rate of speculative processing.

Examples of a scheduling and a scheduling system according to embodiments will be described in detail with reference to the accompanying drawings. According to the scheduling method and the scheduling system of the embodiments, one CPU among multiple CPUs determines the maximum number of speculative processes that can be assigned to the CPUs and assigns to the multiple CPUs, speculative processes of a number less than or equal to the maximum number of speculative processes. The present invention is not limited by the examples.

FIG. 1 is a flowchart of a scheduling method according to a first example of the embodiment. As depicted in FIG. 1, when an apparatus having multiple CPUs starts scheduling, one CPU among the CPUs subtracts the number of processes assigned to each of the CPUs from the maximum number of speculative processes that can be assigned to each of the multiple CPUs. This calculation determines the number of assignable speculative processes for each CPU (step S1).

The CPU sums the results of the subtraction to determine the maximum number of speculative processes (step S2). The CPU then assigns to the multiple CPUs, speculative processes of a number that is less than or equal to the maximum number of speculative processes (step S3). Thus, speculative processes are assigned to each of the CPUs so that the total number of speculative processes assigned to each of the multiple CPUs is less than or equal to the maximum number of speculative processes.

FIG. 2 is a diagram for explaining the scheduling method of the first example. FIG. 2 depicts an example of four CPUs. As depicted in FIG. 2, a speculative process is executed in units called speculative thread 1, and all processes other than the speculative process are regarded as different threads 2. For each of CPUs (#0, #1, #2, and #3) 3, 4, 5, and 6, speculative threads can be assigned to the CPU until the number of assigned speculative threads reaches the upper limit for speculative threads. This means that the upper limit for speculative threads is the maximum number of speculative processes that can be assigned to each CPU. In the example of FIG. 2, the upper limit for speculative threads is three, which is, however, not the specified number.

To each of the CPUs (#0, #1, #2, and #3) 3, 4, 5, and 6, different threads 2 other than the speculative thread 1 are assigned. The number of speculative threads 1 that can actually be assigned to each of the CPUs (#0, #1, #2, and #3) 3, 4, 5, and 6 is, therefore, given by subtracting the number of different threads 2 actually assigned to each of the CPUs (#0, #1, #2, and #3) 3, 4, 5, and 6 from the upper limit for speculative threads.

Although not limited hereto, in the example of FIG. 2, two different threads 2 are assigned to each of the CPU #0_3 and CPU #3_6. The number of speculative threads 1 that can be assigned to the CPU #0_3 and CPU #3_6, respectively, is calculated to be 1 by subtracting the number of different threads 2, which is 2, from the upper limit for speculative threads, which is 3. Similarly, at the CPU #1_4 to which one different thread 1 is assigned, the number of assignable speculative threads 1 is calculated to be 2 by subtracting 1 from 3.

At the CPU #2_5 to which four different threads 2 are assigned, the above subtraction gives a negative value, which means no speculative thread can be assigned to the CPU #2_5. The number of assignable speculative threads 1 in this case, therefore, is 0. In this manner, if the upper limit for speculative threads is determined, the number of assignable speculative threads is determined for each thread. The upper limit for speculative threads and the number of different threads 2 assigned to each of the CPUs (#0, #1, #2, and #3) 3, 4, 5, and 6 are known by the scheduler of one CPU, e.g., CPU #0_3, that performs scheduling.

The maximum number of speculative processes, i.e., the total number of speculative treads 1 that can be assigned to each of the CPUs (#0, #1, #2, and #3) 3, 4, 5, and 6, is calculated to be 4 in the example of FIG. 2. The maximum number of speculative processes n is expressed by equation (1), where N denotes the upper limit for speculative threads at each CPU and Ax denotes the number of different threads present in a CPU #x. If [N−Ax] is a negative value, equation (1) yields 0.

$$n=\Sigma(N-Ax) \quad (1)$$

The scheduler of, for example, the CPU #0_3 that performs scheduling assigns to and distributes among the multiple CPUs (#0, #1, #2, and #3) 3, 4, 5, and 6, n or less speculative threads 1, n being yielded by equation (1). The number of speculative threads 1 to be assigned may be less than n. The number of CPUs may be 2, or 3, or 5 or more.

According to a first example of the embodiment, at each CPU the total number of threads, including speculative threads and different threads, that can be processed may be a value up to the upper limit for speculative threads. Thus, an increase in overhead caused by thread switching can be suppressed, whereby drops in power efficiency and increases in power consumption can be suppressed. The CPUs execute speculative processes of a number that is less than or equal to the maximum number of speculative processes, thereby suppressing drops in the success rate of speculative processing.

In a second example, the scheduling method of the first example is applied as, for example, the scheduling method for a mobile information terminal, such as cellular phone, in a mobile communication system. The mobile information terminal may be driven by a battery.

FIG. 3 is a block diagram of an example of a mobile communication system according to the second example. As depicted in FIG. 3, a terminal 11, which is a mobile information terminal, is connected to a base station 12 through radio communication. The base station 12 is connected to a carrier network 13, which is connected to a network 14, such as the Internet. A service server 15 is connected to the network 14. The terminal 11 receives services provided by the service server 15 via the network 14, carrier network 13, and base station 12.

The service server 15 is provided as, for example, a Web server, file server, etc. A Web server transmits a document or image on a Web page to the terminal 11, based on a request from the terminal 11, or executes software and transmits the result of the execution to the terminal 11. A file server allows other devices on the network to access a memory device managed by the file server.

FIG. 4 is a block diagram of the terminal of the second example. As depicted in FIG. 4, the terminal 11 has multiple CPUs 21, memory 22, and a power management unit (PMU) 23 that are connected to a bus 24. A scheduler 25 is implemented by an operating system (OS) that operates on one of the CPUs 21.

The scheduler 25 acquires from the memory 22, a selection frequency table 36, overhead information 37, and a factor table 38. The scheduler 25 acquires from the power management unit 23, information of the remaining battery power level 39. When acquiring the selection frequency table 36, the scheduler 25 calls a speculation library 33. The scheduler 25 causes the speculation library 33 to operate, based on CPU load information 34 and the upper limit for speculative threads, calculated by a calculation library 31.

The calculation library 31 calculates the upper limit for speculative threads (see FIG. 2), based on the selection frequency table 36, the overhead information 37, the factor table 38, the battery remaining power 39, and an assessment equation 32. For example, the assessment equation 32 may be equation (2). In equation (2), E(N) denotes an assessment value defined for a variable N, and P'(N) denotes the success rate of speculative processing defined for the variable N. The success rate of speculative processing is determined based on the selection frequency table 36. S(N) denotes a thread switching rate defined for the variable N. The thread switching rate is determined based on the overhead information 37. α and β denote factors that are determined based on the remaining battery power level 39 and the factor table 38. The value of the variable N that maximizes the assessment value E(N) may be the upper limit for speculative threads. The success rate of speculative processing, the thread switching rate, and the factor table 38 will be described later.

$$E(N)=\alpha P'(N)-\beta S(N) \quad (2)$$

The scheduler 25 can know the number of different threads assigned to each CPU 21 (Ax of equation (1)), by referring to the CPU load information 34. The speculation library 33, therefore, can know the number of assignable speculative threads ([N−Ax] of equation (1)) for each CPU 21, based on the CPU load information 34 and the upper limit for speculative threads calculated by the calculation library 31 on.

The speculation library 33 sums the number of speculative threads that can be assigned to each of CPUs and thereby, determines the maximum number of speculative processes (n of equation (1)). The speculation library 33 generates speculative processes to be executed of a volume less than or equal to the maximum number of speculative processes, e.g., generates n speculative threads. The speculation library 33 may generate speculative threads by selecting in the descending order of selection frequency, options in the selection frequency table 36 until the number of generated speculative threads reaches the upper limit for speculative threads. The speculative threads are executed in the background.

The memory 22 stores a statistic information database 35, the overhead information 37, and the factor table 38. The statistic information database 35 includes multiple selection frequency tables 36. Each selection frequency table 36 has entries of options and the selection frequencies of the options in a correlated manner. From the overhead information 37, the relation between the number of threads and the rate of thread switching time (thread switching rate) per unit time in a user mode is acquired. The factor table 38 has entries of the battery remaining power 39 and the factors α and β in a correlated manner.

The selection frequency table 36 may be generated based on a past operation history or may be updated with the contents of an operation each time the user executes the operation. The terminal 11 may acquire the selection frequency table 36 from an external resource. For example, when the terminal 11 makes a service request, the service server transmits to the terminal 11, the selection frequency table 36 corresponding to the service request made by the terminal 11. Thus, the manner by which the selection frequency table 36 is generated or from where the selection frequency table 36 is acquired Is not particularly limited. Because the overhead information 37 indicates values unique to the operating system and CPUs, the system designer may prepare the overhead information 37 in advance. The system designer may further prepare the factor table 38 in advance.

The power management unit 23 monitors the remaining power level of the battery and has information concerning the remaining battery power level 39. The power management unit 23 controls the power supplied to each of units making up the terminal 11.

FIG. 5 is a diagram of an example of the selection frequency table of the second example. As depicted in FIG. 5, the selection frequency table 36 has entries of options and the selection frequencies of the options in a correlated manner and, for example, in descending order of selection frequency.

FIG. 6 is a graph depicting an example of the relation between the volume of speculative processes to be executed and the success rate of speculative processing. In FIG. 6, a curve is indicated, which represents the accumulation of the selection frequencies of first to n-th options in descending order of selection frequency as indicated in the selection frequency table 36. The curve depicted in FIG. 6 is expressed by equation (3), where P(n) denotes the success rate of speculative processing defined for the volume of speculative processes to be executed n, and Pn denotes the selection frequency of an option Cn that is the n-th option in descending order of selection frequency as indicated in the selection frequency table 36. The value of the volume of speculative processes to be executed n is determined by, for example, equation (1). FIG. 6 and equation (3) indicate that as the volume of speculative processes to be executed n increases, the success rate of speculative processing P(n) comes closer to 100%. From the viewpoint of the success rate of speculative processing, therefore, a greater number of threads is preferable. However, if the options in the selection frequency table 36 are executed in ascending order of selection frequency, the success rate of speculative processing becomes lower. In equation (2), (N) denotes the success rate of speculative processing defined for a case where the volume of speculative processes to be executed n (for which the success rate of speculative processing is defined as P(n)) is set to the upper limit for speculative threads N.

$$P(n)=\Sigma Pn \quad (3)$$

Figure 7:
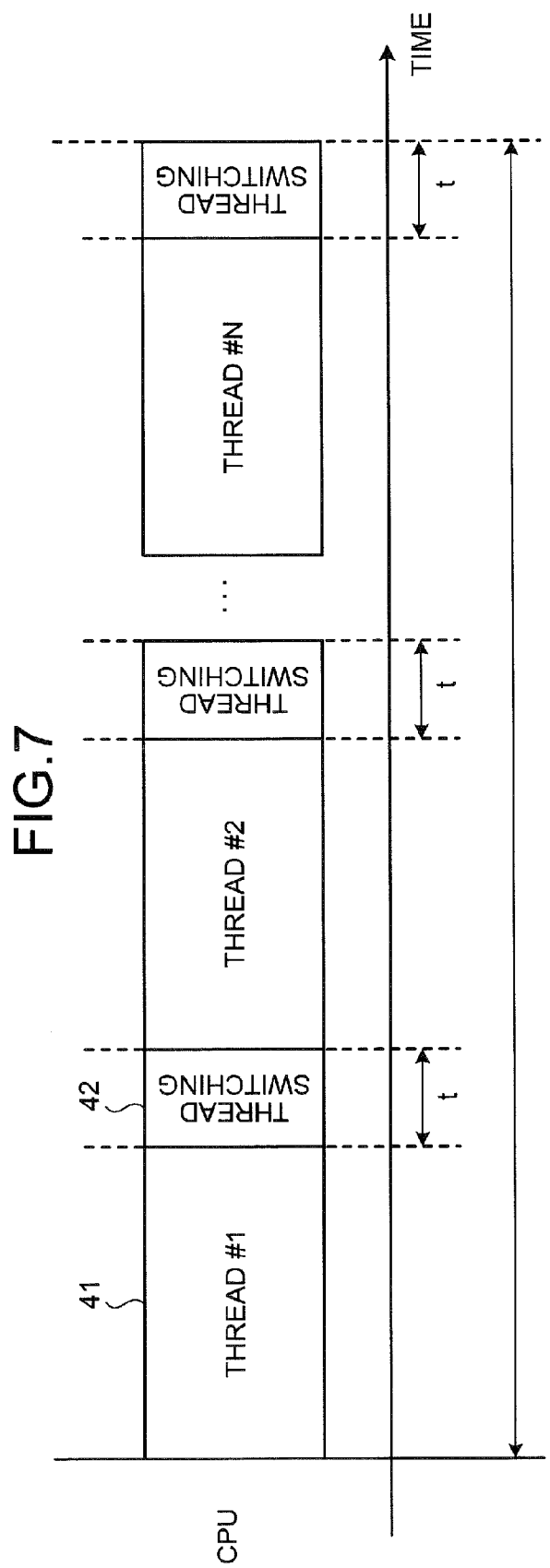
FIG. 7 is a diagram for explaining a thread switching rate according to the second example.

FIG. 7 is a diagram for explaining the thread switching rate according to the second example. As indicated in FIG. 7, when the unit time in the user mode is T (e.g., 1 n second) and the time required for switching a thread 41 (thread switching 42) is t (e.g., 10 μseconds), a thread switching rate S(N) for the upper limit for speculative threads N is expressed by equation (4). A graph expressing equation (4) is depicted in FIG. 8.

$$S(N)=N \cdot t/T \times 100(\%) \quad (4)$$

Figure 8:
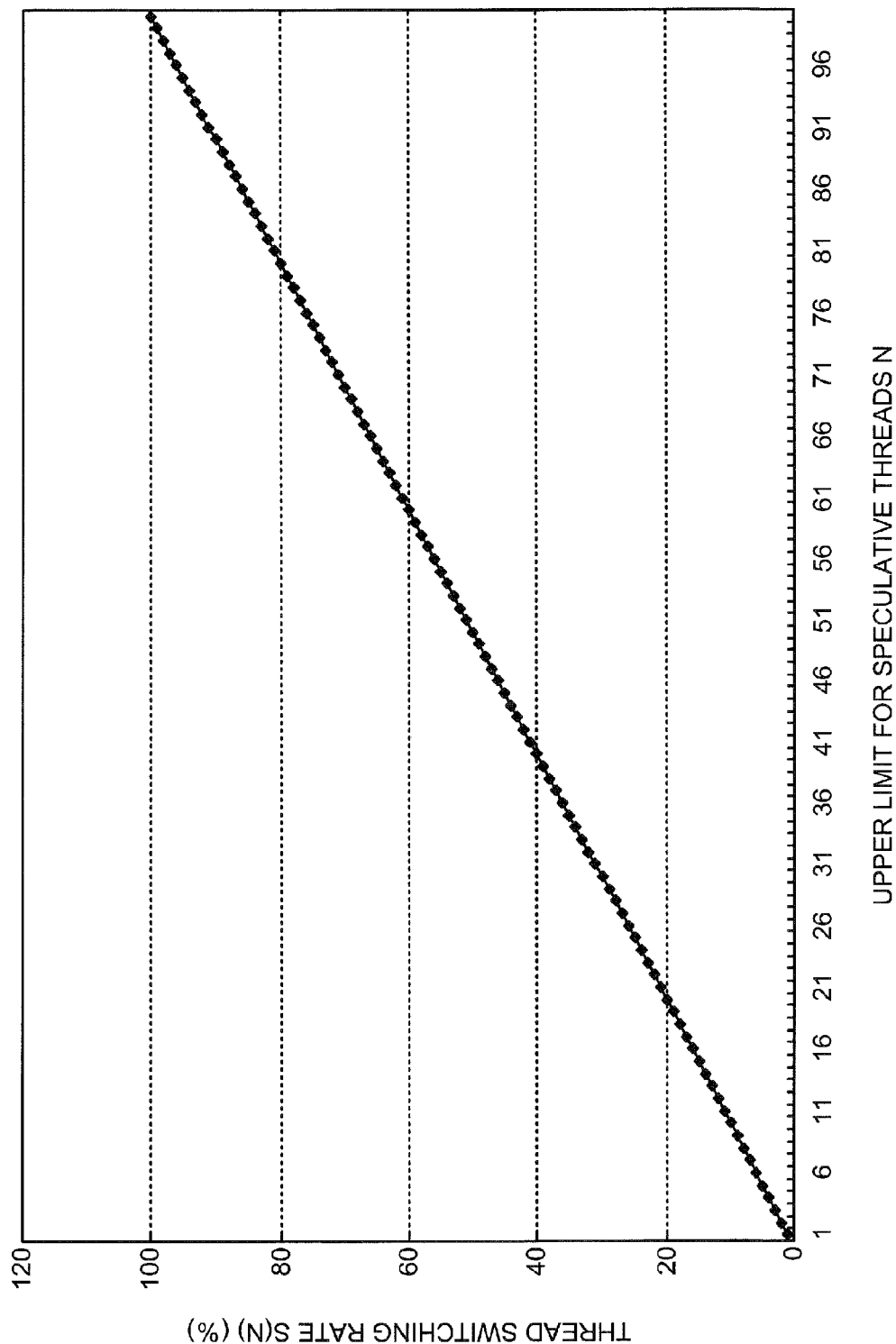
FIG. 8 is a graph depicting an example of a relation between an upper limit for speculative threads and a thread switching rate according to the second example.

FIG. 8 is a graph depicting an example of the relation between the upper limit for speculative threads and the thread switching rate according to the second example. As indicated in FIG. 8, an increase in the number of threads results in a rise in the thread switching rate. A rise in the thread switching rate then leads to an increase in overhead. Increased overhead lowers power efficiency. From the viewpoint of power efficiency, therefore, avoiding an excessive increase in the number of threads is preferable.

Figure 9:
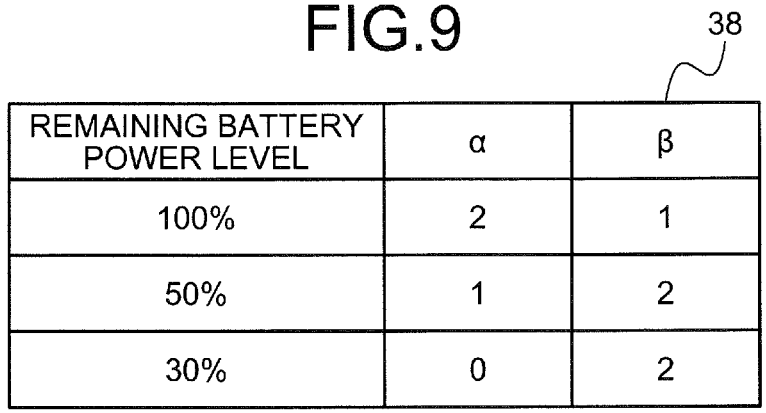
FIG. 9 is a diagram of an example of a factor table of the second example.

FIG. 9 is a diagram of an example of the factor table of the second example. As indicated in FIG. 9, the factors α and β of the assessment equation (2) corresponding to respective remaining battery power levels are entered in the factor table 38. In the example of FIG. 9, for example, when the remaining battery power level exceeds 50%, α is 2 and β is 1. When the remaining battery power level is more than 30% and less than or equal to 50%, α is 1 and β is 2. When the remaining battery power level is less than 30%, α is 0 and β is 2.

It is obvious from the assessment equation that in the assessment value E(n), a larger value of α gives a larger weight to the success rate of the speculative processing, and a larger value of β gives a larger weight to the thread switching rate. When the remaining battery power level is high, therefore, the number of speculative threads increases so that the success rate of the speculative processing increases. When the remaining battery power level decreases, the thread switching rate drops and the number of speculative threads decreases, giving priority to power efficiency. When the remaining battery power level is close to zero, no speculative process is executed. The values of α and β and remaining battery power level threshold values for changing the values of α and β are not limited to the values indicated in FIG. 9.

Figure 10:
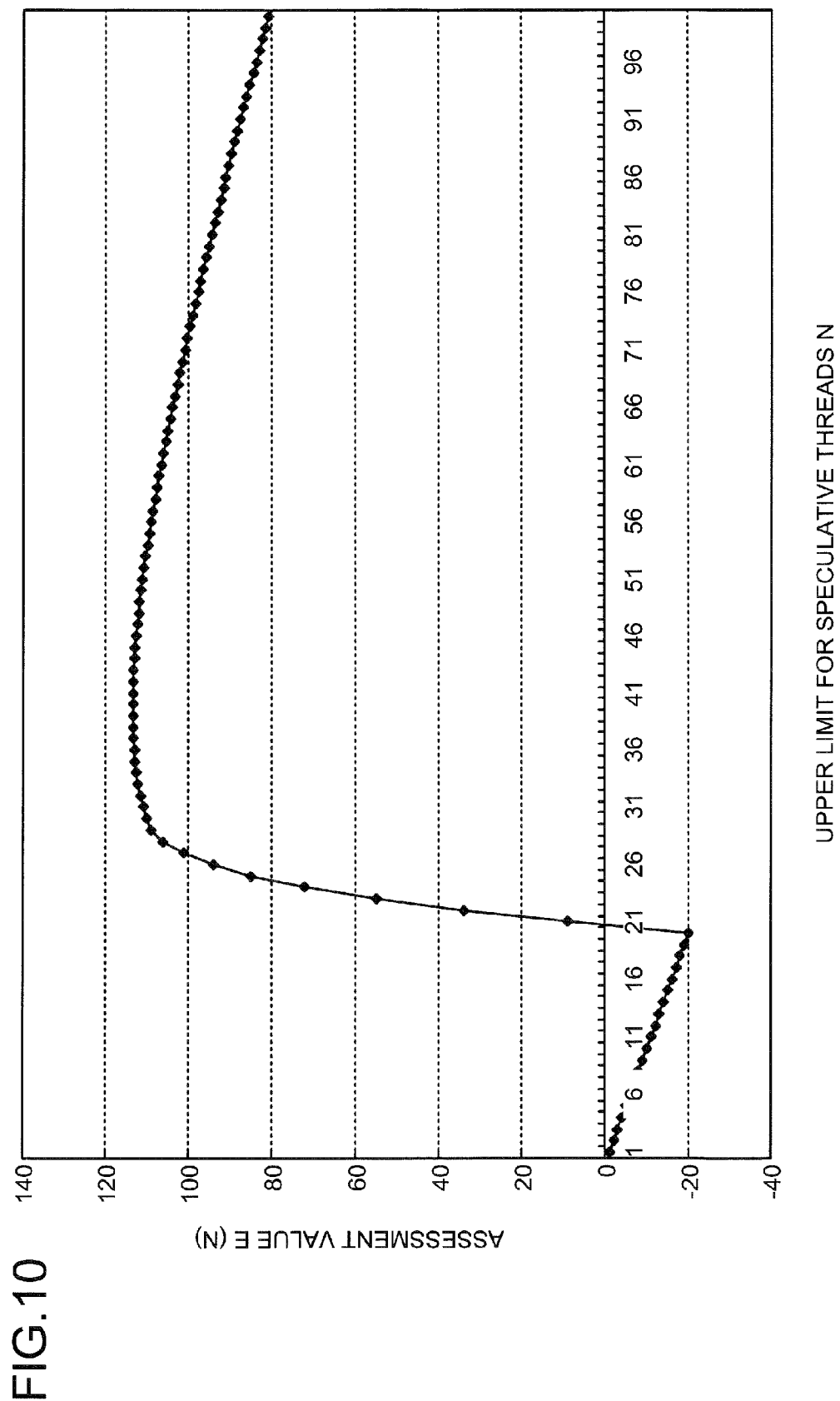
FIG. 10 is a graph depicting an example of a relation between the upper limit value of speculative threads and an assessment value in a case where the remaining battery power level is high in the second example.
Figure 11:
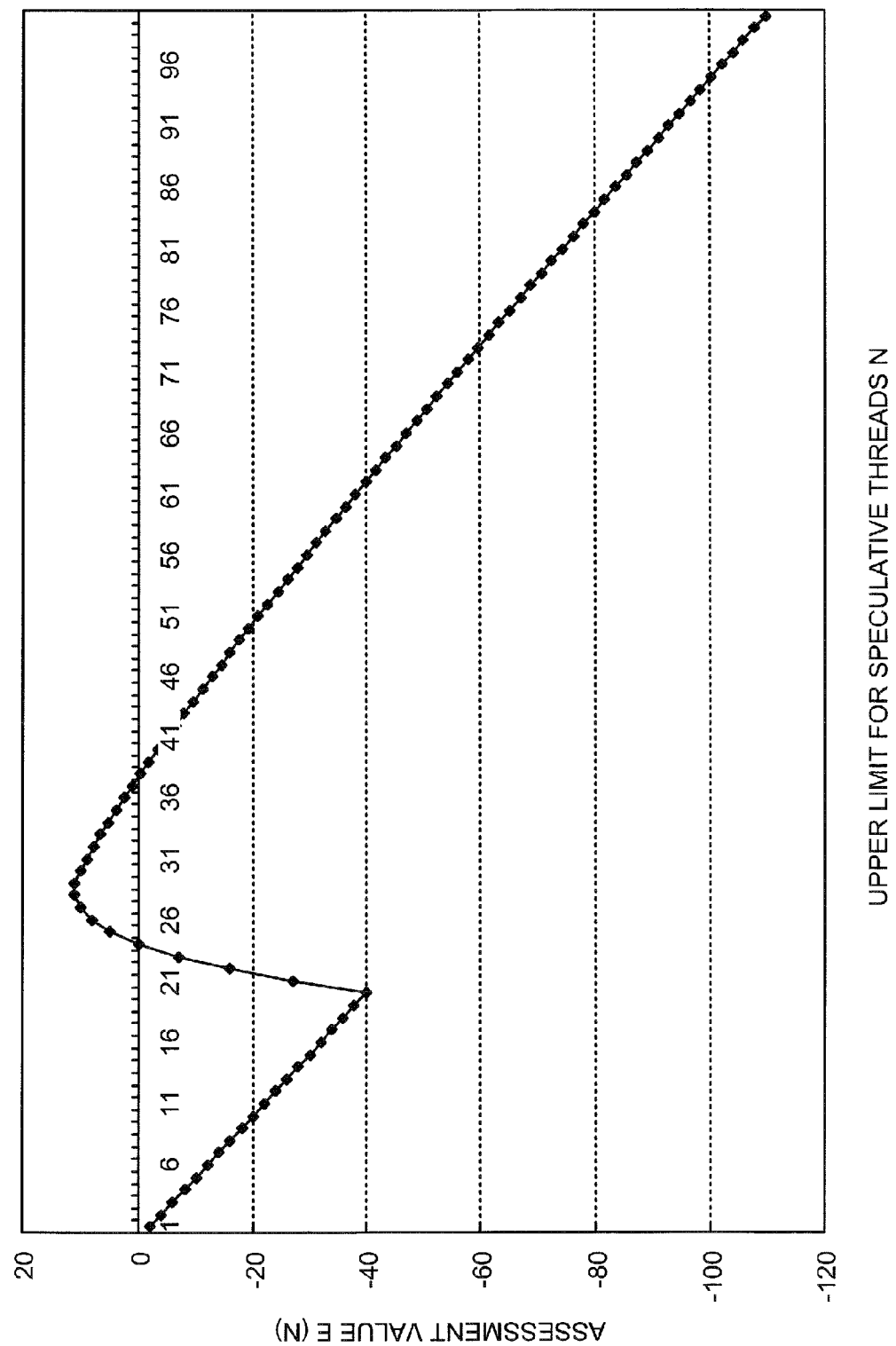
FIG. 11 is a graph depicting an example of the relation between the upper limit value of speculative threads and the assessment value in a case where the remaining battery power level is low in the second example.

FIG. 10 is a graph depicting an example of the relation between the upper limit value of speculative threads and the assessment value in a case where the remaining battery power level is high in the second example. The case depicted in FIG. 10 is equivalent to, for example, a case of the remaining battery power level exceeding 50% indicated in the factor table 38 depicted in FIG. 9. Because α is 2 and β is 1 in this case, the assessment equation (2) is expressed as equation (5). FIG. 11 is a graph depicting an example of the relation between the upper limit value of speculative threads and the assessment value in a case where the remaining battery power level is low in the second example. The case depicted in FIG. 11 is equivalent to, for example, a case of the remaining battery power level being more than 30% and less than or equal to 50% indicated in the factor table 38 of FIG. 9. Because α is 1 and β is 2 in this case, the assessment equation (2) is expressed as equation (6).

$$E(N)=2P'(N)-S(N) \quad (5)$$

$$E(N)=P'(N)-2S(N) \quad (6)$$

According to the curve depicted in FIG. 10, for example, the assessment value E(N) becomes the maximum when N is 40. In the example of FIG. 10, the upper limit for speculative threads N may be, for example, 40. According to the curve depicted in FIG. 11, for example, the assessment value E(N) becomes the maximum when N is 28. In the example of FIG. 11, the upper limit for speculative threads N may be, for example, 28. When the upper limit for speculative threads N increases, the number of speculative threads that can be assigned to each CPU increases. The number of speculative threads processed by multiple CPUs, therefore, increases. When the remaining battery power level is high, the number of speculative threads processed by the multiple CPUs increases. As a result, the success rate of speculative processing rises. When the remaining battery power level is low, the number of speculative threads processed by the multiple CPUs decreases. As a result, power efficiency is improved.

The scheduling method according to the second example will be described using an example in which the user of a cellular phone, i.e., terminal, manipulates a menu to make various selections. In the following description, it is assumed that the cellular phone has two CPU cores (CPU #0, CPU #1).

FIG. 12 is a flowchart of operation of the scheduler according to the scheduling method of the second example. As depicted in FIG. 12, when the user manipulates the cellular phone to open, for example, a menu top screen, the scheduler 25 accesses the statistic information database 35 and attempts to acquire the selection frequency table 36 corresponding to the menu top screen (step S11). An option in the selection frequency table 36 corresponding to the menu top screen may be, for example, a menu screen to which the menu top screen is changed. A selection frequency in the selection frequency table 36 may represent the probability that an option will be selected and is determined based on a past history of selection of the option.

If successful in acquiring the corresponding selection frequency table 36 (step S12: YES), the scheduler 25 calls the speculation library 33 (step S13), and ends the scheduling. If not successful in acquiring the corresponding selection frequency table 36 (step S12: NO), the scheduler 25 ends the scheduling without calling the speculation library 33. The scheduler 25 operates in the same manner not only on the menu top screen but also on a menu screen displayed by a menu selected on the menu top screen.

FIG. 13 is a flowchart of operation of the speculation library according to the scheduling method of the second example. As depicted in FIG. 13, when the scheduler 25 calls the speculation library 33, the speculation library 33 calls the calculation library 31 (step S21). The speculation library 33 thus acquires the upper limit for speculative threads N from the calculation library 31. The speculation library 33 then calculates the volume of speculative processes to be executed n, based on the upper limit for speculative threads N, the number of different threads A0 awaiting execution at the CPU #0, and the number of different threads A1 awaiting execution at the CPU #1 (step S22).

For example, a case is assumed where the upper limit for speculative threads N is 40, the number of different threads awaiting execution at the CPU #0 is 37, and the number of different threads awaiting execution at the CPU #1 is 34. In this case, the volume of speculative processes the CPU #0 is allowed to execute is 3 (=40−37), and the volume of speculative processes the CPU #1 is allowed to execute is 6 (=40−34). Therefore, the volume of speculative processes to be executed n, which is the sum of the volumes of speculative processes executed by the CPUs #0 and #1, is 9 (=3+6).

The speculation library 33 then acquires options of which the number is equal to the volume of speculative processes to be executed n calculated at step S22, from the selection frequency table 36 acquired by the scheduler 25 at step S11 (step S23). For example, when the volume of speculative processes to be executed n is 9, the speculation library 33 may acquire 9 menus from among selectable menus on the menu top screen, in ascending order of selection frequency.

The speculation library 33 then generates speculative threads that execute the acquired options as speculative processes. A speculative thread is generated in the same manner as a thread generated when the user selects a menu. For example, when the speculation library 33 acquires 9 menus from the selection frequency table 36, the speculation library 33 may generate 9 speculative threads. The speculation library 33 then assigns generated speculative threads to the CPUs (step S24).

For example, when the volume of speculative processes the CPU #0 is allowed to execute is 3, the volume of speculative processes the CPU #1 is allowed to execute is 6, and the speculation library 33 generates 9 speculative threads, the speculation library 33 assigns 3 speculative threads and 6 speculative threads to the CPU #0 and the CPU #1, respectively. The speculative threads assigned to the CPUs are executed by the CPUs in the background. The contents of execution of threads in the background are the same as the contents of execution of threads in the foreground. Because the contents of execution of threads in the background is not displayed on the screen of the cellular phone, execution of threads in the background does not hamper the current work the user is performing while viewing the screen of the cellular phone, that is, execution of threads in the foreground.

When a given menu is selected by user operation, the speculation library 33 determines whether the speculative processing is successful (step S25). For example, the speculation library 33 determines whether the menu selected by the user operation matches a speculative thread menu executed in the background. If the speculative processing is successful (step S25: YES), the speculation library 33 transfers to the foreground, the corresponding speculative thread (step S26).

For example, when the corresponding speculative thread is executed in the background to render a menu screen in the background, the speculation library 33 puts the menu screen rendered in the background on the monitor of the cellular phone. The speculation library 33 then deletes all different speculative threads (step S27), and returns to step S13. If the speculative processing is not successful, that is, when all speculative processes end in failure (step S25: NO), the speculation library 33 deletes all the speculative processes (step S27), and returns to step S13 of FIG. 12.

FIG. 14 is a flowchart of operation of the calculation library according to the scheduling method of the second example. As depicted in FIG. 14, when the speculation library 33 calls the calculation library 31, the calculation library 31 acquires the corresponding selection frequency table 36, the overhead information 37, and the factor table 38 (step S31). The calculation library 31 then determines the upper limit for speculative threads N that makes the assessment value E(N) maximum, for example, in the manner described with reference to FIGS. 10 and 11 (step S32). Thereafter, the calculation library 31 returns to step S21 of FIG. 13.

The second example offers the same effect as the first example.

According to the scheduling method and the scheduling system, increases in power consumption can be suppressed and decreases in the success rate of the speculative processing can also be suppressed.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A scheduling method executed by a CPU among a plurality of CPUs, the scheduling method comprising:
    calculating a maximum number of speculative processes capable of being assigned to each of the CPUs, based on selection frequencies of respective speculative processes in the past, a process switching rate, and a remaining battery power level;
    subtracting, for each of the CPUs, a number of processes other than speculative processes assigned to the CPU from the maximum number of speculative processes capable of being assigned to each of the CPUs;
    summing results of subtracting for each of the CPUs to get a total number of speculative processes capable of being assigned to each of the CPUs;
    selecting, based on the selection frequencies of respective speculative processes in the past, speculative processes of which a number is less than or equal to the total number of speculative processes; and
    assigning to the CPUs, the selected speculative processes of which the number is less than or equal to the total number of speculative processes capable of being assigned to each of the CPUs.

2. The scheduling method according to claim 1, further comprising
    selecting based on a probability of execution of speculative processes, speculative processes of which a number is less than or equal to the total number of speculative processes.

3. The scheduling method according to claim 1, further comprising
    deleting speculative processes excluding one speculative process when the one speculative process among speculative processes of a number less than or equal to the total number of speculative processes is actually executed.

4. The scheduling method according to claim 3, further comprising
    transferring a given speculative process from a background to a foreground, when the given speculative process among speculative processes of the number less than or equal to the total number of speculative processes matches a process specified by an external operation.

5. The scheduling method according to claim 1, further comprising
    transferring a given speculative process from a background to a foreground, when the given speculative process among speculative processes of the number less than or equal to the total number of speculative processes matches a process specified by an external operation.

6. A scheduling system comprising:
    a plurality of CPUs; and
    a scheduler that assigns processes to the CPUs, wherein the scheduler is configured to:
    calculate a maximum number of speculative processes capable of being assigned to each of the CPUs, based on selection frequencies of respective speculative processes in the past, a process switching rate, and a remaining battery power level;
    subtract, for each of the CPUs, a number of processes other than speculative processes assigned to the CPU from the maximum number of speculative processes capable of being assigned to each of the CPUs;
    sum results of subtracting for each of the CPUs to get a total number of speculative processes capable of being assigned to each of the CPUs;
    select, based on the selection frequencies of respective speculative processes in the past, speculative processes of which a number is less than or equal to the total number of speculative processes; and
    assign to the CPUs, the selected speculative processes of the number that does not exceed the total number of speculative processes capable of being assigned to each of the CPUs.

7. The scheduling system according to claim 6, wherein the selected speculative processes are executed in a background and a speculative process to actually be executed among the selected speculative processes is transferred to a foreground.

8. The scheduling system according to claim 7, wherein a speculative process other than the speculative process to actually be executed is deleted.

* * * * *